(12) United States Patent
Stappaerts

(10) Patent No.: US 6,934,475 B2
(45) Date of Patent: Aug. 23, 2005

(54) FREE-SPACE OPTICAL COMMUNICATIONS USING HOLOGRAPHIC CONJUGATION

(75) Inventor: Eddy A. Stappaerts, San Ramon, CA (US)

(73) Assignee: The Regents of the University of California, Oakland, CA (US)

(*) Notice: Subject to any disclaimer, the term of this patent is extended or adjusted under 35 U.S.C. 154(b) by 517 days.

(21) Appl. No.: 09/931,331

(22) Filed: Aug. 16, 2001

(65) Prior Publication Data

US 2003/0053164 A1 Mar. 20, 2003

(51) Int. Cl.$^7$ .............................................. H04B 10/00
(52) U.S. Cl. ...................... 398/121; 398/124; 398/125
(58) Field of Search ................... 398/186, 121, 398/122, 124, 125, 130, 129, 162; 250/491.1, 206.3

(56) References Cited

U.S. PATENT DOCUMENTS

| | | | |
|---|---|---|---|
| 4,635,299 A | * 1/1987 | MacGovern | 398/129 |
| 4,879,532 A | 11/1989 | Shemwell et al. | 330/4.3 |
| 4,953,954 A | 9/1990 | Ewbank et al. | 350/354 |
| 5,166,507 A | * 11/1992 | Davis et al. | 250/201.9 |
| 5,256,869 A | 10/1993 | Lin et al. | 250/201.9 |
| 5,317,442 A | * 5/1994 | Sharp et al. | 398/170 |
| 5,378,888 A | 1/1995 | Stappaerts | 250/201.9 |
| 5,513,022 A | 4/1996 | Son et al. | 359/16 |
| 5,539,562 A | * 7/1996 | Morioka et al. | 398/131 |
| 5,548,434 A | * 8/1996 | Shimonaka et al. | 398/162 |
| 5,555,128 A | 9/1996 | Khoury et al. | 359/559 |
| 5,764,365 A | * 6/1998 | Finarov | 356/630 |
| 5,886,800 A | * 3/1999 | Aprahamian et al. | 359/16 |
| 5,959,747 A | 9/1999 | Psaltis et al. | 359/22 |
| 6,016,212 A | * 1/2000 | Durant et al. | 398/131 |
| 6,115,123 A | 9/2000 | Stappaerts et al. | 356/345 |
| 6,507,685 B1 | * 1/2003 | Polynkin et al. | 385/37 |
| 6,509,992 B1 | * 1/2003 | Goodwill | 398/131 |
| 6,704,509 B1 | * 3/2004 | Yang et al. | 398/34 |

OTHER PUBLICATIONS

"Quantum Confidential" Simon Singh, New Scientist, Oct. 2, 1999, p28–33 (review article).
"Free–space quantum key distribution in daylight", R.J. Hughes et al, Journal of Modern Optics, 2000, vol. 47, No. 2/3, 549–562.
"Free–space daylight single–photon communications over 1.6 km", W.T. Buttler et al., May 7–12, 2000, paper QThJ4, Quantum Electronics and Laser Science Conference (QELS 2000).
"Daylight Quantum Key Distribution over 1.6km", W.T. Buttler et al Physical Review Letters, Jun. 12, 2000 vol. 84, No. 24.

* cited by examiner

Primary Examiner—M. R. Sedighian
Assistant Examiner—Christina Y. Leung
(74) Attorney, Agent, or Firm—Michael C. Staggs; Alan H. Thompson; James M. Skorich

(57) ABSTRACT

A beacon beam is transmitted from a receiver to a transmitter. The transmitter generates and transmits a conjugate beacon beam back to the receiver, where it is interfered with a local oscillator beam to form a hologram. The hologram is used to configure a spatial light modulator as a diffraction grating. A conjugate communications laser beam containing information is subsequently transmitted to the receiver. The diffraction grating deflects the conjugate communications beam to a fixed and known direction, whereupon it is directed through a spatial filter.

Since the direction of the conjugate communications beam is fixed and known, the diameter of the filter aperture can be minimized to accept the communications beam while rejecting almost all of the background light. A high-speed detector directly detects the filtered conjugate communications beam. The detector output is transmitted to a demodulator that extracts the information carried by the communications beam.

15 Claims, 9 Drawing Sheets

FREE-SPACE OPTICAL COMMUNICATIONS USING HOLOGRAPHIC CONJUGATION

FIELD OF THE INVENTION

The present invention relates to adaptive optics and, more particularly, to reducing receiver noise in free-space laser communications by using holographic conjugation.

BACKGROUND OF THE INVENTION

Lasers comprise a preferred means of communication through free-space because they can transmit substantially more information over long distances in comparison to radio waves or microwaves, due to their much higher frequency and therefore significantly smaller beam divergence and greater bandwidth. However, laser communications traversing earth's atmosphere are degraded by ubiquitous turbulence. Lasers are affected more than lower frequency electromagnetic waves because atmospheric turbulence causes rapid changes in the density, and thus the index of refraction, across the path of the laser beam.

Due to the heterogeneous nature of turbulence, the rays composing the beam will encounter differing densities. This will cause their respective path lengths to the receiver to become unequal, resulting in differing phases and thus a distorted wavefront at the receiver. Furthermore, the received laser beam will no longer have the uniform amplitude that it had when emitted. The turbulence-induced distortion also increases the divergence of the beam, which reduces the signal-to-noise ratio ("SNR") because it increases the portion of the laser beam that will fall outside of the receiver aperture.

Under operating conditions where the receiver noise is dominated by background light, the SNR is given by $S^2/n$, where S and n are the number of photoelectrons per bit due to the signal and background, respectively. Background light, especially solar, represents a significant source of communications receiver noise. Reducing the receiver field-of-view lowers the background light, but it increases the difficulty of closing the communications link between the receiver and the transmitter, especially when the two are separated by a long distance or are translating relative to one another. One approach is to use a mechanical servo system to vary the direction of the receiver's field-of-view. However, such servo systems are expensive, bulky, heavy and mechanically complex. While certainly a consideration for even a terrestrial receiver, the size and weight become particularly critical when the receiver is to be placed in earth orbit or airborne.

Receiver noise sources other than background light, in particular detector thermal (Johnson) noise, further decrease the SNR of optical communications receivers. Heterodyne detection can overcome the noise introduced by receiver noise as well as background light, and provide quantum-limited detection, but its use in free-space communications has been rendered impossible or impractical due to pointing jitter and wavefront distortions of the received communications beam.

As encryption has become an increasingly important aspect of communications, the additional demands it places on laser communications have been brought to the forefront. Quantum encryption, which provides the ultimate encryption technique, requires distribution of a quantum key ("QKD"). QKD requires the receiver to detect and differentiate between individual photons. This, in turn, makes it necessary to eliminate or at least mitigate the adverse effects of atmospheric refraction and background light, while at the same time maximizing the field-of-view of the receiver to facilitate closure of the communications link.

One solution to the problem of atmospheric turbulence is described in U.S. Pat. No. 5,378,888, "Holographic System for Interactive Target Acquisition and Tracking," issued to the present inventor. The foregoing reference uses real-time holography to generate a phase-conjugate laser beam that, after twice traversing the intervening turbulence, impinges the receiver aperture having the lateral cross section, the phase across its wavefront, and the angle of incidence that it would have had in the absence of turbulence. However, neither this reference nor any other prior art resolves the technical difficulties attendant to optical communications posed by receiver background light, detector noise, atmospheric turbulence, and the relative translation between the receiver and a transmitter; as well as provides the capability to detect and differentiate single photons for QKD under the foregoing conditions. The present invention fulfills these needs in the art.

SUMMARY OF THE INVENTION

Briefly, a spatial light modulator in a receiver is configured with a quadratic phase pattern corresponding to a diverging lens so that, when a laser beam is applied, a diverging beacon beam is transmitted from the receiver in the direction of the transmitter. Although the location of the transmitter may not be precisely known, the divergence is sufficient to ensure intersection of the beacon beam with an optical aperture on the transmitter. The atmosphere in between the receiver and the transmitter typically distorts the beacon beam. Holographic apparatus on the transmitter determines the distortion of the received beacon beam and uses this information to configure a spatial light modulator. A laser beacon beam is applied to the configured spatial light modulator to generate a phase-conjugated or field-conjugated beacon beam that travels along the same path, in the opposite direction, as the diverging beacon beam.

The conjugate beacon beam intersects an optical aperture on the receiver and is subsequently interfered with a local oscillator beam to form a hologram. The hologram is used to configure a spatial light modulator as a diffraction grating. A communications laser beam containing information is subsequently applied to the previously configured spatial light modulator on the transmitter to form a conjugate communications beam that is transmitted to the receiver along the same path as the conjugate beacon beam. The conjugate communications beam is deflected by the diffraction grating written on the receiver spatial light modulator to a fixed and known direction, whereupon it is passed through a spatial filter comprised of a lens and an optical aperture.

Since the direction of the conjugate communications beam is fixed and known, the diameter of the aperture can be minimized to accept the communications beam while rejecting almost all of the background light. A high-speed detector then detects the filtered conjugate communications beam. The output of the high-speed detector is transmitted to a demodulator that extracts the information carried by the communications beam.

In an alternative embodiment, the conjugate communications beam is composed of single photons for QKD, in which case a single-photon detector is used for detection of the spatially filtered photons. Another alternative uses a heterodyne detection apparatus in conjunction with the fixed, known direction of the conjugate communications beam.

In a further alternative embodiment, a random phase pattern is initially written on the spatial light modulator of the receiver. As a result, the returning conjugate beacon beam impinges the entire receiver aperture, in comparison to impinging only a portion of the receiver aperture when a quadratic phase pattern is used. The resultant hologram has a noisy, irregular grating pattern, but one of enhanced accuracy with respect to the direction of the incident beacon beam because the beam fills the entire aperture. Additional processing is required to extract the periodicity and orientation of the grating pattern from the hologram, and obtain the approximate direction of the transmitter.

The spatial light modulator of the receiver is then written with a numerically-generated pattern derived from the hologram and a superimposed quadratic pattern so that it emits a secondary beacon beam having a divergence angle less than that of the first beacon beam. The divergence angle can be decreased because the centerline of secondary beacon beam will pass closer to the transmitter than that of the first beacon beam. A secondary conjugate beam returned from the transmitter is used to write a diffraction grating on the spatial light modulator of the receiver.

A communications beam is then applied to the spatial light modulator of the transmitter using a secondary conjugate pattern written thereon. The resultant conjugate communications beam is transmitted to the receiver and the information carried therein is extracted as previously discussed in conjunction with the first embodiment. The additional, secondary steps of the foregoing alternative embodiment are typically used only for the initial closure of the communications link between the receiver and the transmitter.

DETAILED DESCRIPTION OF THE INVENTION

Figure 1A:
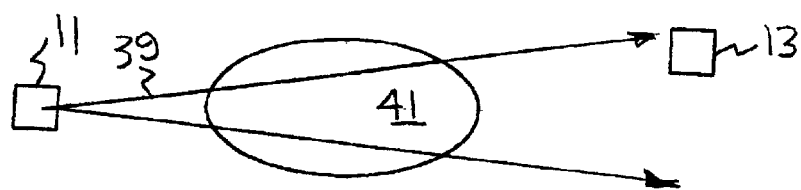
FIGS. 1A, 1B, and 1C are schematic drawings presenting the sequence of steps used by the present invention to close the communications link between a transmitter and a receiver.
Figure 1B:
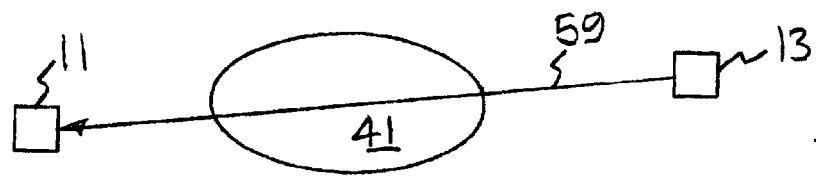
Figure 1C:
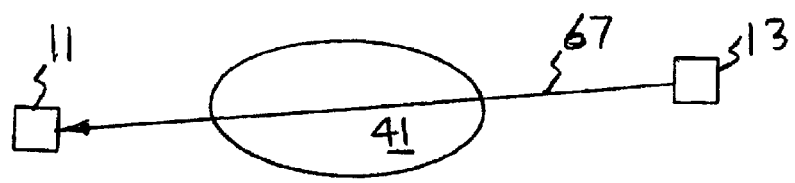
Figure 2:
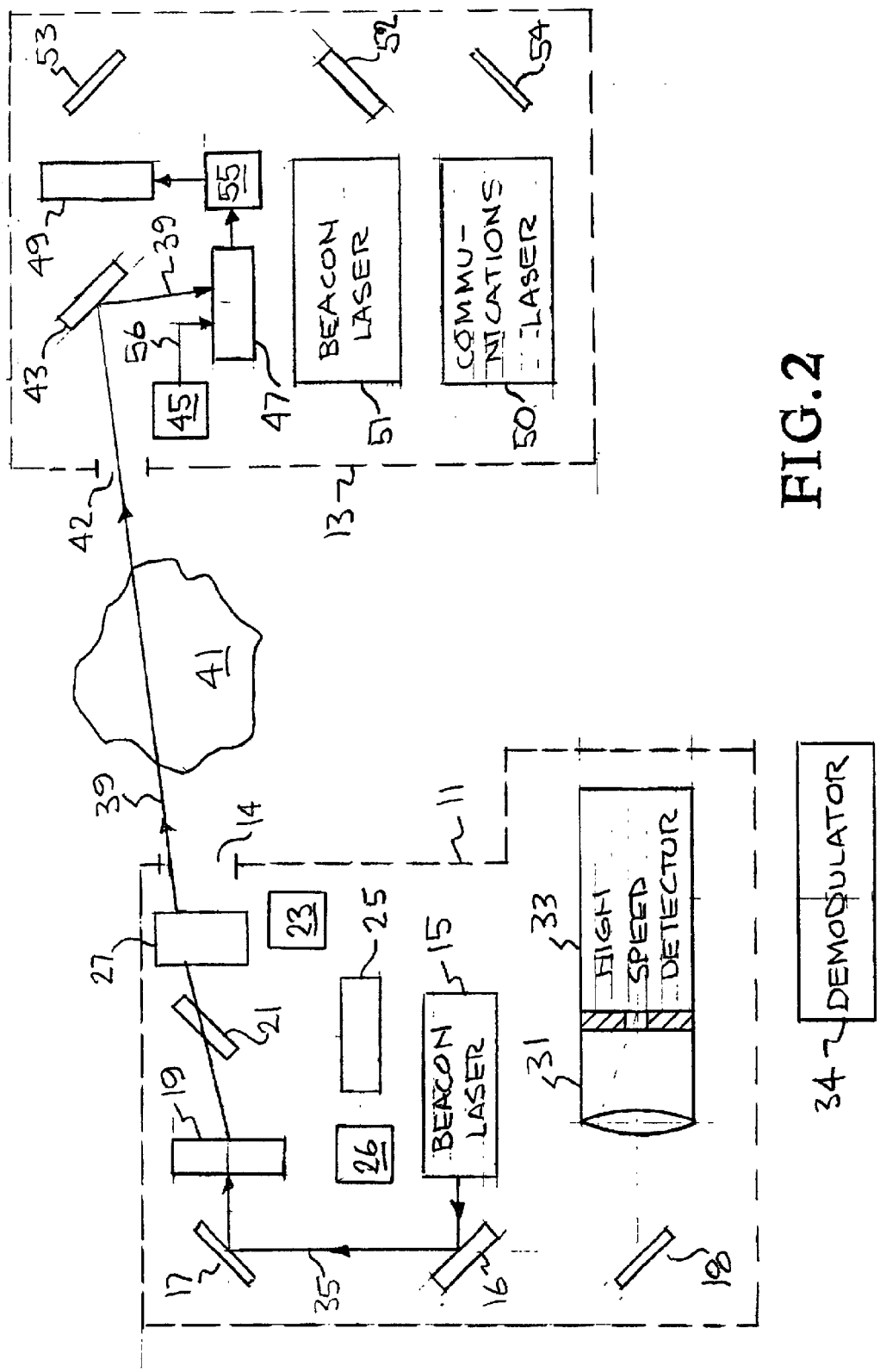
FIG. 2 is a schematic drawing of the present invention, particularly showing the elements in the receiver used to send a diverging beacon beam to intersect a transmitter.

Turning to the drawings, FIGS. 1A, 1B and 1C present the sequence of steps used by the present invention to establish optical communication between receiver 11 and transmitter 13. FIG. 2 is a schematic drawing showing the elements comprising receiver 11 and transmitter 13. Receiver 11 includes optical aperture 14, beacon laser 15, beamsplitter 16, mirrors 17 and 18, spatial light modulator ("SLM") 19, beamsplitter 21, local oscillator ("LO") 23, integrating detector array ("IDA") 25, processor 26, field-imaging telescope 27, spatial filter 31, high-speed detector 33, and demodulator 34. Beacon laser 15 emits pulsed beacon laser beam 35, which is reflected off of beamsplitter 16 and mirror 17, and onto SLM 19.

Beam 35 is near diffraction-limited, i. e., it has nearly uniform phase across its wavefront. SLM 19 is configured with a quadratic phase pattern causing SLM 19 to act as a diverging optic with respect to beam 35. The application of beam 35 to SLM 19 generates diverging beacon laser beam 39, having a spherical wavefront and a conical axial cross section. SLM 19 is cleared of the foregoing phase pattern immediately after the transmission of beacon beam 39.

Since the location of transmitter 13 relative to receiver 11 is usually not precisely known, and to simplify beacon beam pointing, SLM 19 provides beam 39 with sufficient divergence to ensure that a portion of beam 39 intersects transmitter 13. FIG. 1A schematically shows the interception of transmitter 13 by diverging beacon beam 39. Beam 39 is typically distorted by turbulence as it passes through atmosphere 41 in traveling from receiver 11 to transmitter 13.

Transmitter 13 includes optical aperture 42, beamsplitter 43, LO 45, IDA 47, SLM 49, communications laser 50, beacon laser 51, beamsplitter 52, mirrors 53 and 54, and processor 55. LO 45 emits near diffraction-limited LO beam 56. A portion of distorted beacon beam 39 is reflected off of beamsplitter 43 and interfered with LO beam 56 to form a hologram on IDA 47. The hologram is processed by processor 55 using methodology well known to knowledgeable practitioners of adaptive optics, to derive a conjugate wavefront pattern. SLM 49 is configured with the foregoing conjugate wavefront pattern.

Figure 3:
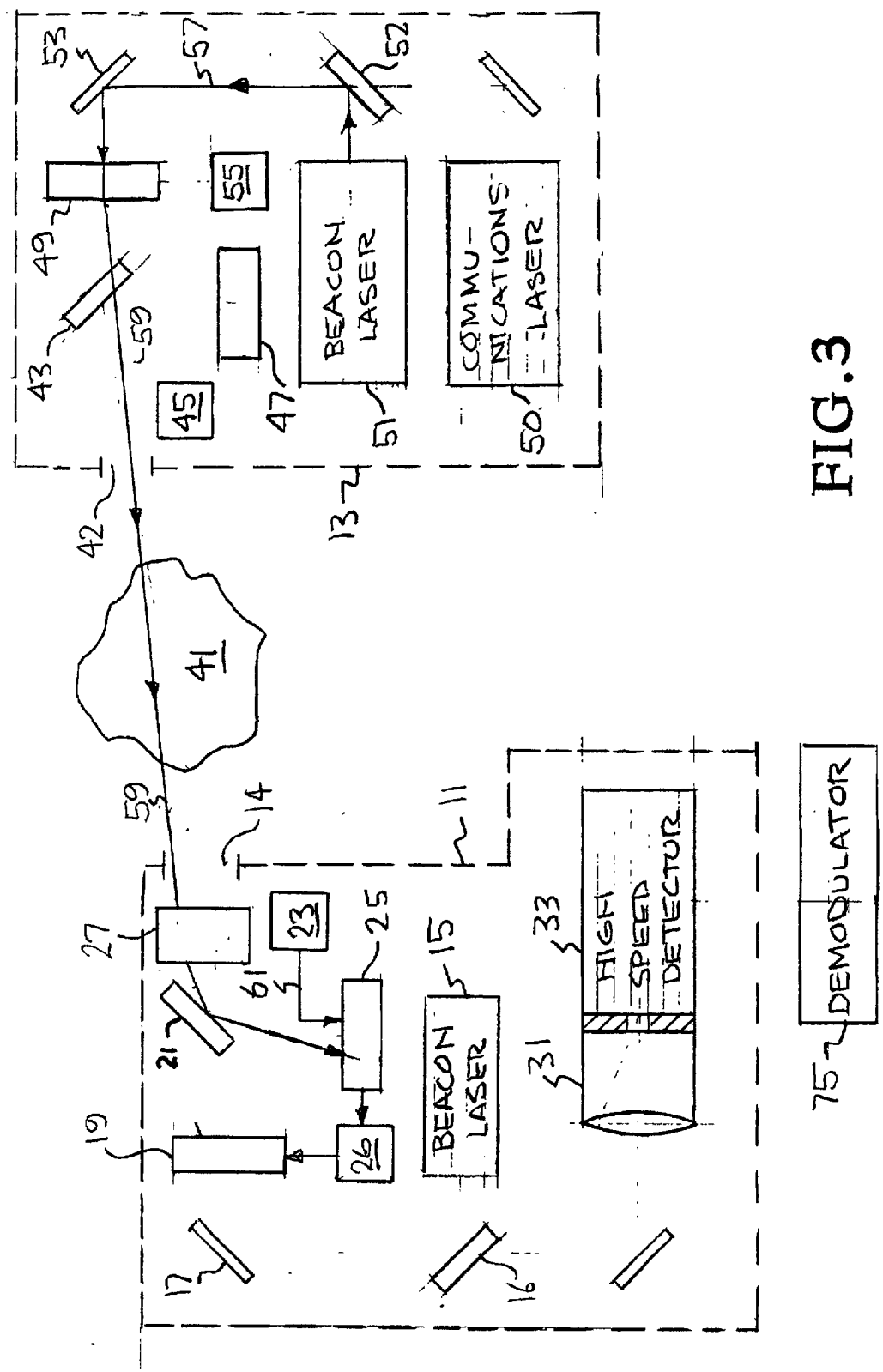
FIG. 3 is a schematic drawing of the present invention, particularly showing the elements of the transmitter used to send a conjugate beacon beam to the receiver, and the elements of the receiver used to write a diffraction grating on a spatial light modulator included therein.

As shown in FIG. 3, pulsed beacon laser beam 57 is emitted by beacon laser 51 and, after reflecting off of beamsplitter 52 and mirror 53, is applied to SLM 49, resulting in the emission of conjugate beacon beam 59 from transmitter 13 towards receiver 11. As also shown in FIG. 1B, conjugate beacon beam 59 retraces the path of beacon beam 39 due to its phase conjugate property, and subsequently intersects receiver 11. Since beacon beam 59 has a conjugate wavefront derived from distorted beacon beam 39, and as it again passes through distorting atmosphere 41 along the same path and in the opposite direction as beacon beam 39, the wavefront of conjugate beacon beam 59 is near diffraction-limited upon impinging aperture 14.

Figure 4:
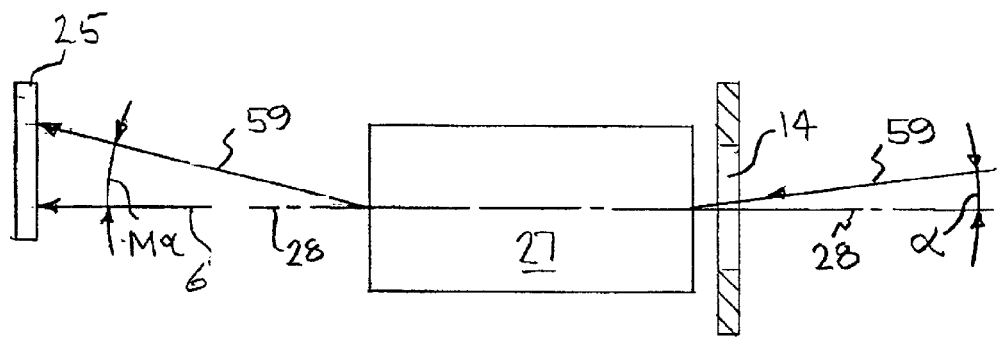
FIG. 4 is a schematic drawing showing the angle of incidence, $\alpha$, of the conjugate beacon beam incident to the receiver aperture; and the angle of incidence, $M\alpha$, of the conjugate beacon beam on the integrating detector array, where it interferes with a local oscillator beam.

Field-imaging telescope 27 includes two lenses separated by the sum of their respective focal lengths. As schematically shown in FIG. 4, beacon beam 59 passes through aperture 14 and enters telescope 27 at angle of incidence α with respect to telescope optical axis 28, which lies colinear with the optical axis for aperture 14. Telescope 27 increases the angle of incidence of beacon beam 59 on IDA 25 by the factor M, i.e., to Mα, where M is the ratio of the respective focal lengths of its two lenses, and is at least one. Concomitantly, telescope 27 reduces the diameter of beacon beam 59 by a factor of M.

After being modified by telescope 27, a portion of impinging beacon beam 59 is reflected off of beamsplitter 21 and onto IDA 25. LO 23 emits near diffraction-limited LO beam 61 and it is directed onto IDA 25, where it interferes with beacon beam 59. The resulting hologram consists of a simple grating-like pattern with a fringe orientation and a period that are both a function of the magnified angle of incidence, Mα, of conjugate beacon beam 59 on IDA 25. The angle between beacon beam 59 and LO beam 61 is also Mα. The hologram is transferred to processor 26. The resulting processed hologram is written on SLM 19, which thereby forms a diffraction grating.

Figure 5:
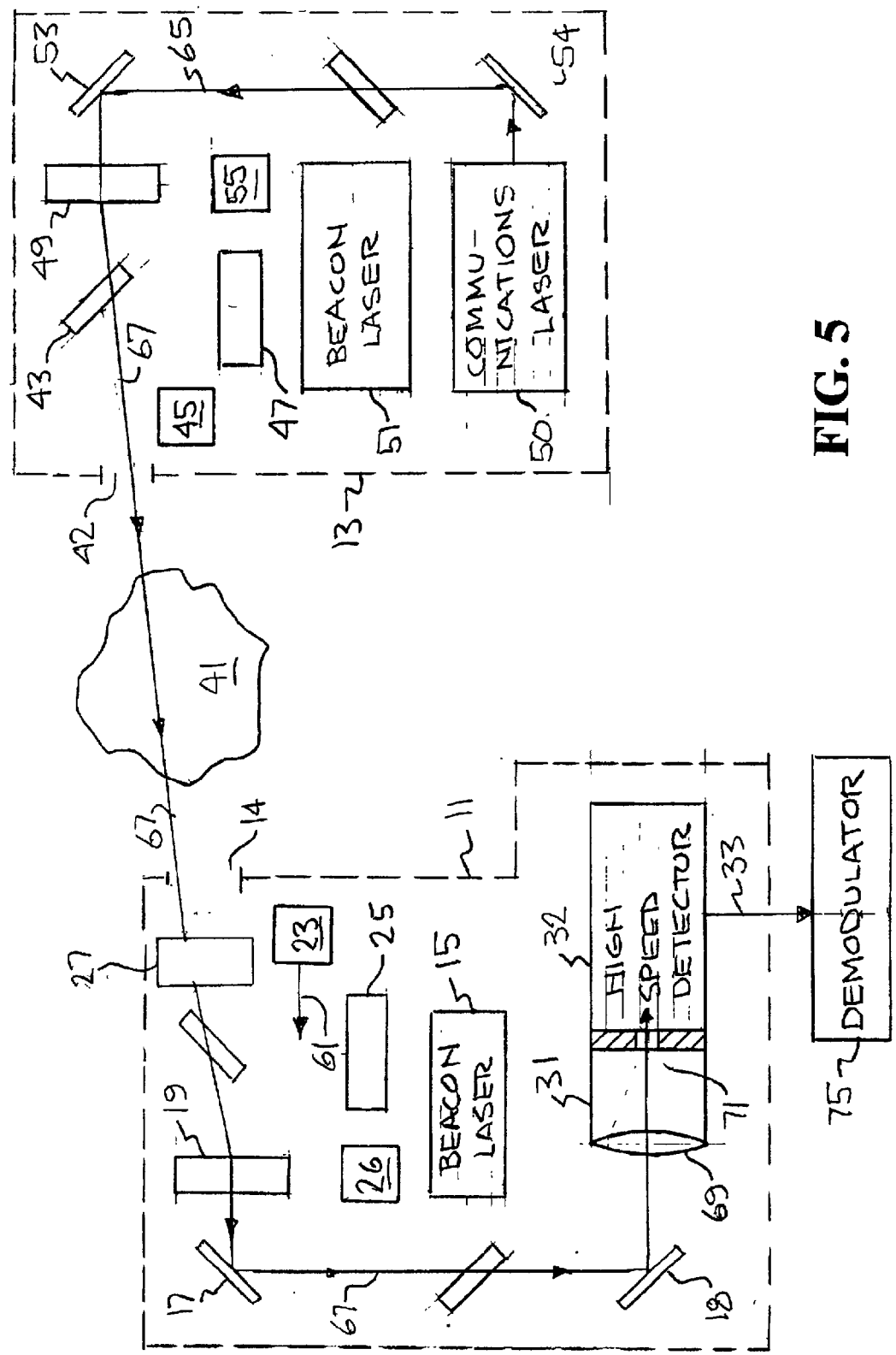
FIG. 5 is a schematic drawing of the present invention, particularly showing the elements used to send a conjugate communications beam from the transmitter to the receiver, and to extract the information carried by the foregoing beam.

As shown in FIG. 5, communications laser 50 then emits communications laser beam 65 carrying information to be transmitted from transmitter 13 to receiver 11. After reflecting off of mirrors 54 and 53, beam 65 is applied to SLM 49 while SLM 49 is still configured with the conjugate phase pattern previously written thereon and applied to beacon beam 59. As also shown in FIG. 1C, this results in the transmission of conjugate communications beam 67 from transmitter 13 along the same path through distorting atmosphere 41 as previously traveled by conjugate beacon beam 59.

Figure 6:
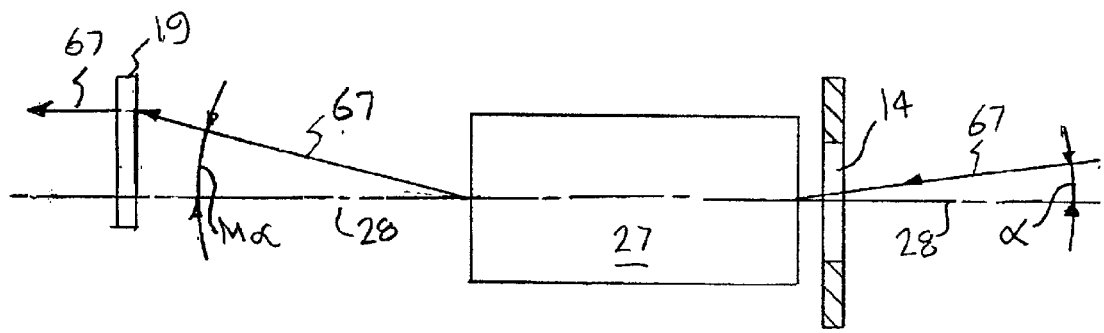
FIG. 6 is a schematic drawing illustrating the deflection of the incident communications beam by the diffraction grating of the spatial light modulator of the receiver, to a direction parallel to the local oscillator beam.

Conjugate communications beam 67 has a near diffraction-limited wavefront upon impinging aperture 14 and telescope 27 at an angle of incidence α. As shown in FIG. 6, beam 67 is emitted from telescope 27 at an angle of Mα with respect to optical axis 28 and LO beam 61. As shown in FIG. 4, the diffraction grating written on SLM 19 was derived from interfering beacon beam 59 and LO beam 61, with the angle Mα between them. Therefore, the diffraction grating of SLM 19 will deflect an incident beam the same angle Mα from its original, incident course. For communications beam 67 incident on SLM 19 at the angle Mα with respect to the known, fixed direction of LO beam 61, the diffraction grating of SLM 19 will deflect communications beam 67 from its original, incident course by the angle Mα. Plane geometry indicates that the deflected communications beam 67 will lie parallel to LO beam 61. In summary, regardless of the angle of incidence, α, of communications beam 67 onto aperture 14, the diffraction grating written on SLM 19 will deflect communications beam 67 to a fixed, known direction, i.e., parallel to fixed LO beam 61.

The period of the interference fringes of the hologram formed on IDA 25 is equal to $$\frac{\lambda}{\alpha * M} \quad (1)$$

where λ is the wavelength of conjugate beacon beam 59.

Thus, the period of the interference fringes decreases as α increases. A periodicity that is too small for the spatial sampling rate of IDA 25 will adversely affect the accuracy of the reconstructed hologram written on SLM 19 and ultimately result in communications beam 67 not being deflected precisely parallel to LO beam 61.

Spatial filter 31 includes lens 69 and optical aperture 71, with aperture 71 being located in the focal plane of lens 69. Aperture 71 is sized according to the quality of communications beam 67, and is aligned with the predicted course of communications beam 67 after it has been deflected by the grating of SLM 19. Thus, an inaccurate or imprecise grating will cause communications beam 67 to wander from a course parallel to LO beam 61 and cause a part of communications beam 67 to fall outside of and be rejected by aperture 71. This will lower the SNR. To avoid the foregoing outcome, and in accordance with the Nyquist criteria, the hologram must be sampled by IDA 25 at the rate of at least two samples per cycle.

The receiver field-of-view at aperture 14 within which transmitter 13 can be acquired is proportional to the number of pixels on IDA 25. This relationship is expressed as follows:

$$FOV = \frac{N * \lambda}{D} \quad (2)$$

where: FOV is the two-dimensional field-of-view at aperture 14;

N is the number of pixels in each row and column of IDA 25 (assuming an equal number of rows and columns, i.e., IDA 25 is a square);

D is the diameter of aperture 14; and

λ is the wavelength of the beam being emitted, i.e., beacon beam 39. (The respective wavelengths of all of the beams referred to herein are identical and equal to λ).

For a prior art communication apparatus having a receiver aperture diameter and a field-of-view equal to those of the present in invention, and where the wavelength of the laser beams used therein is identical to λ of the present invention:

$$FOV_p = FOV \quad (3)$$

and;

$$n_p \sim FOV^2 = \left(\frac{N * \lambda}{D}\right)^2 \quad (4)$$

where;

$FOV_p$ is the field-of-view for a receiver aperture of the prior art; and $n_p$ is the background light impinging the detector of the prior art.

FOV and its equivalent are squared in equation (4) because FOV is defined as a two-dimensional angle, whereas $n_p$ is incident in three dimensions.

With the present invention, the grating of SLM 19 deflects communications beam 67 to a known and fixed direction, whereupon it passes through spatial filter 31. The diameter of aperture 71 is sized no smaller than the diffraction limit of communications beam 67:

$$\frac{\lambda * f}{d} \quad (5)$$

where: d is the diameter of communications beam 67 incident upon lens 69; and f is the focal length of lens 69.

Virtually all of communications beam 67 will thus pass through spatial filter 31 and impinge high-speed detector 32.

The background rejection factor, BRF, is defined as the ratio of the background light accepted by the communications apparatus of the prior art, to the background light accepted by the present invention, and is given by the square of the ratio of the spot diameter of the background light in the focal plane of the prior art equivalent of lens 69, f*FOV*D/d, to the diameter of aperture 71 of the present invention, λf/d. Since M=D/d, BRF may be expressed as:

$$BRF = \frac{(f*FOV*M)^2}{\left(\frac{\lambda*f}{d}\right)^2} = \frac{\left(\frac{f*N*\lambda}{d}\right)^2}{\left(\frac{\lambda*f}{d}\right)^2} = N^2 \quad (6)$$

For a typical N=128, BRF=1.6*10$^4$, which indicates that the present invention obtains a reduction in the accepted background light up to 4 orders of magnitude relative to the prior art. This reduction can be advantageously used in several ways.

As previously noted, the background-limited signal-to-noise ratio, SNR, is given by:

$$SNR = \frac{S^2}{n} \quad (7)$$

Assuming the same SNR for a communications device of the prior art as that for the present invention, and with the identical range between the respective transmitters and receivers:

$$SNR_i = SNR_p \quad (8)$$

or $$\frac{S_i^2}{n_i} = \frac{S_p^2}{n_p} \quad (9)$$

where: $SNR_i$ is the signal-to-noise ratio and $S_i$ is the required signal strength for the present invention; and '$SNR_p$ is the signal-to-noise ratio and $S_p$ is the required signal strength for a communications device of the prior art. Rearranging the terms and taking the square root:

$$S_i = S_p \left(\frac{n_i}{n_p}\right)^{.5} \quad (10)$$

Since:

$$\left(\frac{n_p}{n_i}\right) = N^2 \quad (11)$$

it follows that $$S_i = \frac{S_p}{N} \quad (12)$$

Equation (12) indicates that, keeping the same SNR and maintaining the same range, the signal strength required using the present invention, $S_i$, is reduced from the signal strength required using the prior art, $S_p$, by a factor of N. Thus, for N=128, $S_i$ would be less than $S_p$ by up to 2 orders of magnitude.

Alternatively, for the same SNR and communications laser power, the decreased background light accepted by the present invention allows for an increase in the range, "R", over the prior art. Generally, $$S \sim \frac{1}{R^2} \quad (13)$$

Where $R_i$ is the maximum range provided by the present invention, and $R_p$ is the maximum range provided by the prior art:

$$\frac{R_i}{R_p} = \left(\frac{S_p}{S_i}\right)^{.5} = N^{.5} \quad (14)$$

The equation 14 shows that, for the same SNR, $R_i$ is increased over $R_p$ by a factor of N$^5$. For N=128 and for the same signal strength, S, the present invention will thus increase the range by up to a factor of 11.3, or approximately an order of magnitude, over the prior art.

After passing through spatial filter 31, filtered communications beam 67 impinges high-speed detector 32, which detects the intensity of communication beam 67 and translates the foregoing into electronic output 33. Output 33 is conveyed to demodulator 75, which extracts the information carried by communications beam 67 using means and methods well known to those skilled in the communication arts.

Figure 7:
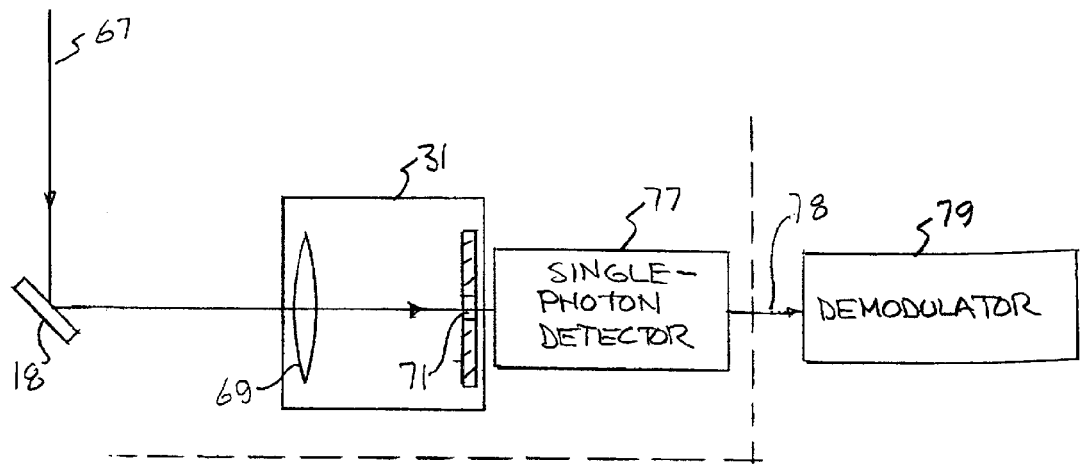
FIG. 7 is a schematic drawing showing a single-photon detection device being used in conjunction with the present invention.

Alternatively, communications beam 67 is composed of a burst of single photons. This alternative is feasible because the increase in the SNR obtained by the present invention allows single photons to be detected in the midst of background light. As shown in FIG. 7, single-photon detector 77 (instead of high-speed detector 32) detects the photons passing through spatial filter 31. Output 78 of single-photon detector 77 is conveyed to photon demodulator 79, which extracts the information carried by the photons composing communications beam 67 using means and methods well known to those skilled in the communication arts, including a decoding device for QKD. This allows quantum encryption of the information carried by communications beam 67.

Figure 8:
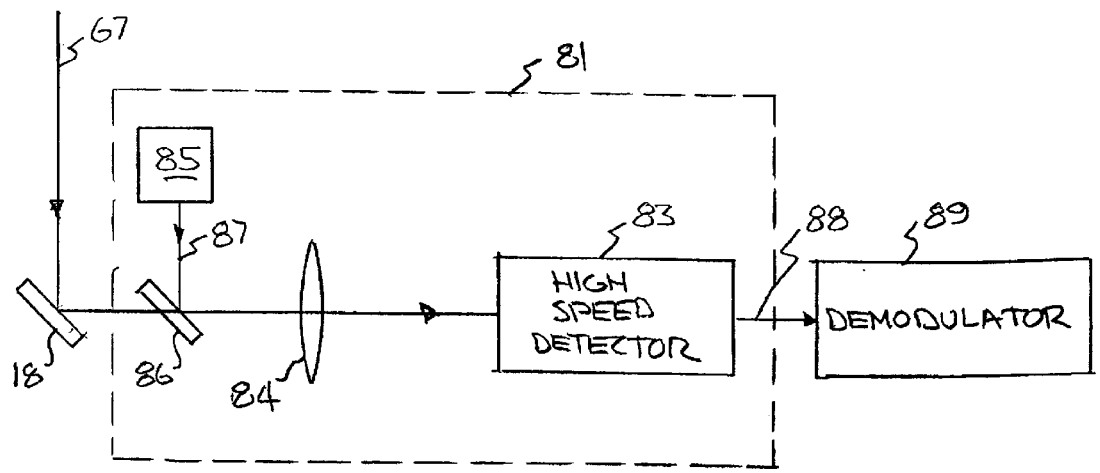
FIG. 8 is a schematic drawing showing a heterodyne detection apparatus being used in conjunction with the present invention.

As the present invention provides a near diffraction-limited communications beam having a fixed and known direction, heterodyne detection may also be used in conjunction with the present invention. In such an alternative embodiment, spatial filter 31 is not a part of receiver 11. As shown in FIG. 8, receiver 11 instead includes heterodyning apparatus 81, including high-speed detector 83, lens 84, LO 85 and beamsplitter 86.

LO beam 87 is emitted by LO 85. Beamsplitter 86 transmits communications beam 67 and reflects LO beam 87 onto a course collinear with communications beam 67. The combined beams pass through lens 84 and interfere on high-speed detector 83. The interference causes detector 83 to generate output signal 88. Demodulator 89 then demodulates output signal 88 to extract the information carried by communications beam 67. Heterodyne detection eliminates both background light noise and detector noise, and thereby provides quantum-limited sensitivity having a SNR of 2S. This is typically an improvement of two to three orders of magnitude over the SNR for direct detection using a semiconductor detector.

Although the previously described embodiment of the present invention provides an improvement in the SNR over that of the prior art, error sources such as strong turbulence in atmosphere 41 or a high rate of transverse motion between receiver 11 and transmitter 13, may change the path between receiver 11 and transmitter 13 at a rate that degrades the accuracy of the grating formed by SLM 19. This would, in turn, cause the direction of communications beam 67 to wander outside of aperture 71 and decrease the SNR to a value lower than it would be under more sanguine operating conditions. Although the size of aperture 71 could be enlarged to ensure transmission of the communications beam through the aperture, this solution would also decrease the SNR because it would increase the amount of background light transmitted by the spatial filter.

Additional processing of the hologram on IDA 25 to enhance the accuracy of the grating formed by SLM 19 would avoid an adverse effect on the SNR otherwise occasioned by the aforementioned difficult operating conditions. The foregoing entails processor 26 using means and methods well known to those skilled in the field of adaptive optics, e.g., a Fourier transform, to extract the periodicity and orientation of the fringes. A digital, numerically generated grating pattern having the periodicity and orientation of the hologram created on IDA 25 by interfering conjugate beacon beam 59 and LO beam 61, is then written on SLM 19. The additional processing adds time to the processing step.

Figure 9:
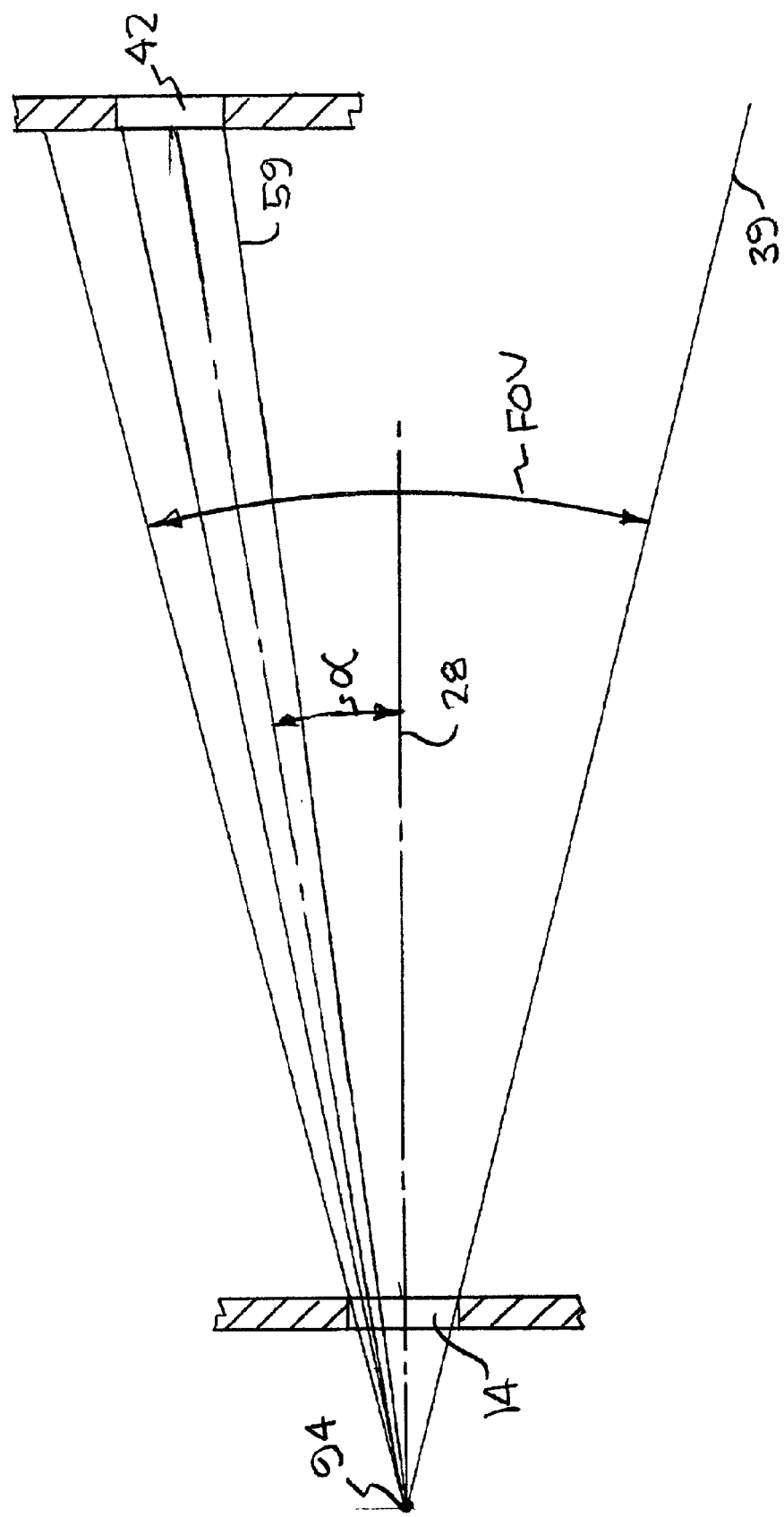
FIG. 9 is a schematic drawing showing a spherical, diverging beacon beam being emitted by the receiver and intersecting the transmitter.

As illustrated in FIG. 9, diverging beacon beam 39 results from applying a quadratic phase profile to SLM 19. This causes beacon beam 39 to have virtual focal point 94 behind aperture 14 and a spherical diverging wavefront. Only a portion of the spherical wavefront intercepts transmitter aperture 42. Due to the intrinsic properties of phase conjugation, the area on aperture 14 illuminated by conjugated beacon beam 59 is only a fraction of the aperture size.

A reduction in the illuminated area of aperture 14 proportionally decreases the area of IDA 25 being illuminated and, therefore, the size of the hologram. This reduced size, in turn, adversely affects the accuracy of the grating formed by SLM 19. This effect aggravates the degradation in accuracy caused by a reduction in the number of samples per period of the hologram that is concurrently occasioned by increasing the angle of incidence, α. As previously discussed, such a grating inaccuracy causes aperture 71 to reject a portion of communications beam 67, thereby decreasing the SNR.

Figure 10:
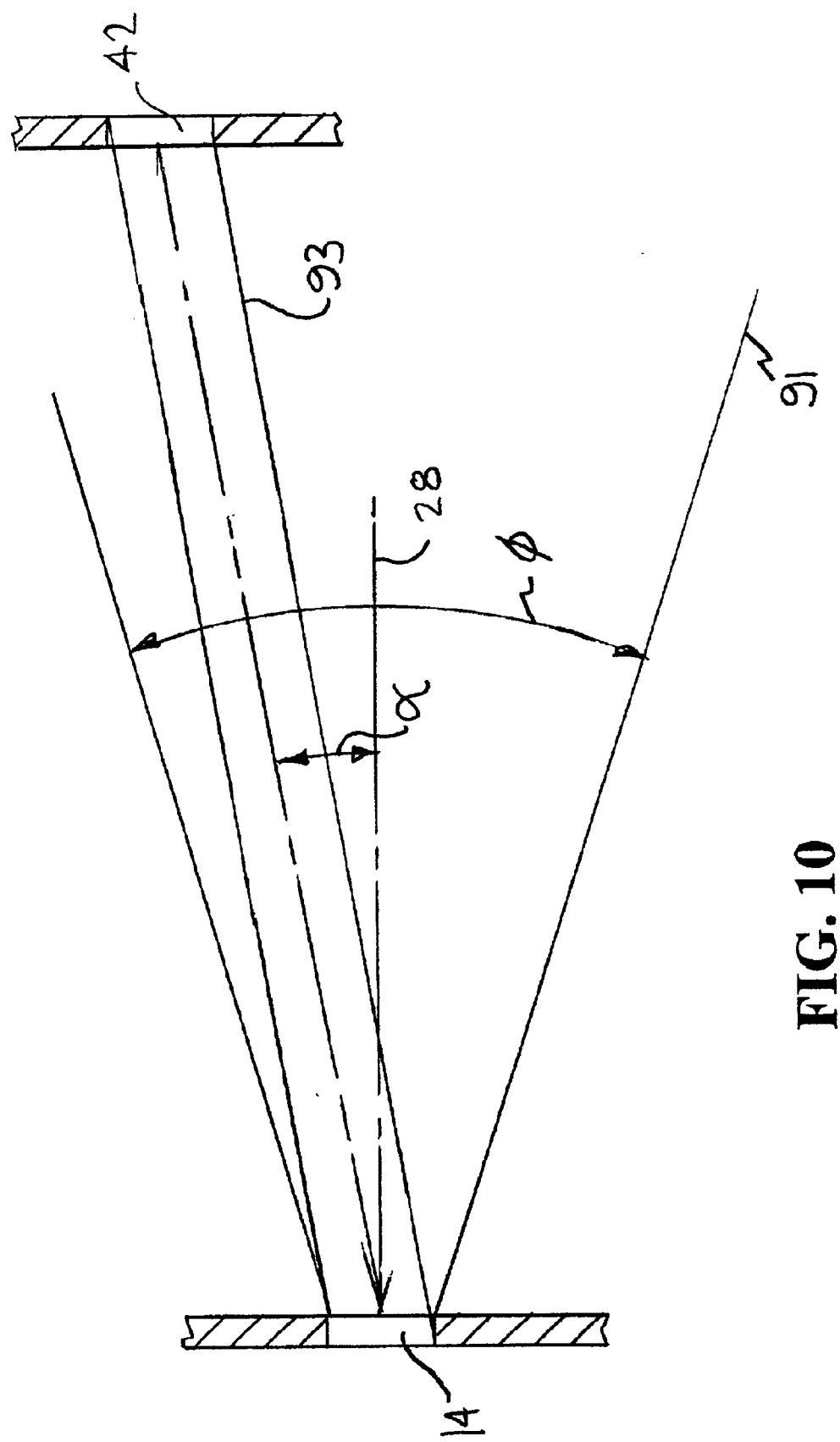
FIG. 10 is a schematic drawing showing a beacon beam composed of beamlets having random phases, being emitted by the receiver and intersecting the transmitter.
Figure 11A:
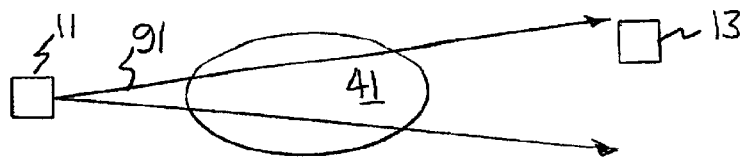
FIGS. 11A, 11B, 11C, 11D and 11E are schematic drawings presenting the five step sequence used by an alternative embodiment of the present invention to close the communications link between a transmitter and a receiver.

However, the present invention can be modified from the previously described embodiment to improve the SNR. More particularly, FIGS. 10 and 11A show beacon beam 91 being emitted upon beam 35 being applied to SLM 19 written with a spatially random pattern of 0 and π phase values. Each pixel of SLM 19 independently transmits a beamlet having no phase relationship with the other beamlets. Beacon beam 91 is composed of the foregoing beamlets, each having a spherical wavefront that diverges at the diffraction-limit, φ, according to the following expression:

$$\varphi = \frac{\lambda}{p * M} \quad (15)$$

where p=the size of each of the uniform pixels composing the face of SLM 19. Since the number of pixels in each row and column of SLM 19 is the same as the number, N, for IDA 25:

$$p * M = \frac{D}{N} \quad (16)$$

Substituting equation (16) into equation (15):

$$\varphi = \frac{N * \lambda}{D} \quad (17)$$

or $$\varphi = \text{FOV} \quad (18)$$

Therefore, the divergence angle, φ, for beacon beam 91 when the pixels of SLM 19 are written with random 0 and π phase values is the same as the receiver FOV at aperture 14, and the same as the maximum divergence angle possible using a quadratic phase profile simulating a diverging lens. However, unlike uniform intensity across beacon beam 39, the intensity across beam 91 randomly varies and its wavefront is not spherical.

Instead, each of the pixels of SLM 19 transmits a beamlet with an optical axis orthogonal to aperture 14 and with a far-field spherical wavefront. If the range is sufficiently large, the wavefront of beacon beam 91 at aperture 42 is nearly flat as it impinges across aperture 42.

Figure 11B:
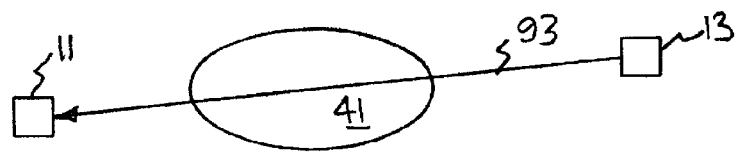

Aperture 42 intercepts part of each beamlet composing beacon beam 91. Conjugate beacon beam 93 is formed responsive to beacon beam 91 by the components comprising transmitter 13 in the manner previously discussed herein. FIGS. 10 and 11B show conjugate beacon beam 93 being transmitted from transmitter 13 to receiver 11. Each of the conjugate beamlets composing conjugate beacon beam 93 returns to its originating pixel on SLM 19; however, since only a small fraction of beacon beam 91 is intercepted by aperture 42, the cross section for each conjugate beamlet at aperture 14 is larger than the pixel size, with the exact size depending on the range. The electric field at aperture 14 is the sum of all the conjugate beamlets, and conjugate beam 93 thus impinges the entire aperture 14. Consequently, the hologram created by interfering beam 93 and LO beam 61 covers the entire area of IDA 25.

Since each of the beamlets composing beacon beam 91 has a random phase, each of the beamlets composing conjugate beacon beam 93 also has a random phase. When interfered with LO beam 61, the resulting hologram is not a pure sinusoidal waveform, but has some distortion. Even so, the periodicity and direction of the grating pattern can be extracted by using the additional processing previously discussed in conjunction with processor 63 to generate a digital hologram.

To compensate for error in determining the direction of transmitter 13 relative to the receiver optical axis at aperture 14, processor 63 superimposes a quadratic phase profile simulating a diverging lens onto the directional tilt phase profile extracted from the hologram formed on IDA 25. This combined pattern is written on SLM 19 so that secondary beacon beam 98 is pointed at transmitter 13, but with some divergence to compensate for remaining errors. Since the position of transmitter is approximately known from the directional information provided by the hologram on IDA 25, this divergence angle is significantly less than the divergence angle, φ, of first beacon beam 91.

Figure 11C:
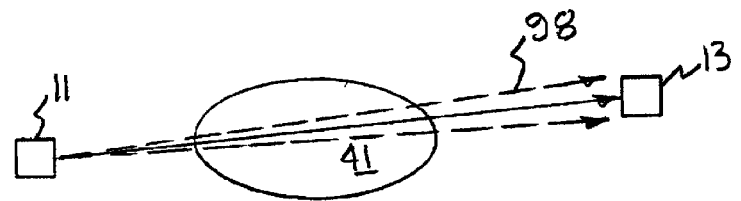
Figure 11D:
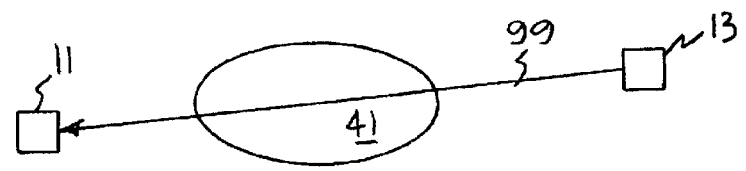

As shown in FIG. 11C, a portion of secondary beacon beam 98 intercepts transmitter 13. In the manner previously discussed in reference to beacon beams 39 and 91, a secondary conjugate beacon beam 99 is generated by transmitter 13 and, as shown in FIG. 11D, transmitted towards and intercepted by receiver 11. Beam 99 is then interfered with LO beam 61 to create a hologram on IDA 25 and, after processing by processor 63, writes a grating on SLM 19.

Figure 11E:
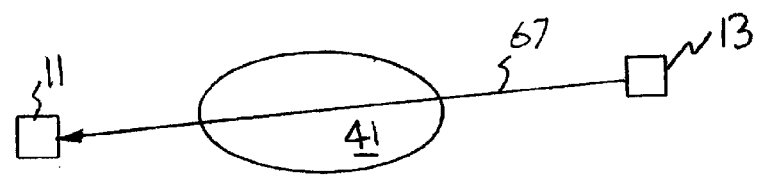

As shown in FIG. 11E, conjugate communications beam 67 is then generated and transmitted from transmitter 13 to receiver 11. The grating written on SLM 19 that results from interfering secondary conjugate beacon beam 99 and LO beam 61, deflects communications beam 67 to a known, fixed direction. Beam 67 is subsequently filtered and demodulated as previously described.

The additional intermediate steps described in the latter embodiment, i.e., the steps shown in FIGS. 11C and 11D, enhance the accuracy of the deflection grating of SLM 19. They are particularly useful in the presence of strong turbulence in atmosphere 41 or in the event of a high rate of transverse motion between receiver 11 and transmitter 13. However, even under the aforementioned extreme operating conditions, these steps are typically required only for the initial closure of the communications link between receiver 11 and transmitter 13, i.e., the first reception of communications beam 67 by receiver 11. Subsequent updates of the grating pattern on SLM 19 can typically be carried out without the aforementioned intermediate loop closure employing a random phase pattern on SLM 19 because the direction of transmitter 13 will remain known with sufficient precision.

The random phase pattern may also be initially written on SLM 19 without subsequently emitting secondary beacon beam 98 and secondary conjugate beacon beam 99. In this alternative embodiment, only beacon beam 91 and conjugate beacon beam 93 are used to close the communications link between receiver 11 and transmitter 13, and subsequently update the grating pattern on SLM 19, i.e., beacon beam 91 and conjugate beacon beam 93 are used in conjunction with the steps shown in FIGS. 1A and 1B.

It is to be understood that the foregoing description relates to several embodiments of the invention, and that modifications may be made thereto without departing from the spirit and scope of the invention as set forth in the following claims.

I claim:

1. A method of communicating that uses a laser beam comprising:
   intercepting a receiving means with a conjugate beacon beam;
   forming a hologram by interfering the conjugate beacon beam with a local oscillator beam, wherein the formed hologram comprises a grating pattern having a fringe orientation and period that are a function of a magnified angle of incidence of the conjugate beacon beam;
   intercepting the receiving means with a communications beam comprising a configured phase pattern of the conjugate beacon beam;
   deflecting the communications beam to a fixed course relative to the local oscillator beam as a result of the processed grating pattern; and
   detecting the deflected communications beam.

2. The communications method defined in claim 1 wherein the detecting step includes aligning a spatial filter with the fixed course of the deflected communications beam.

3. The communications method defined in claim 1 further comprising the step of demodulating the detected communications beam to extract information transmitted therein.

4. The communications method defined in claim 1, further comprising generating a beacon beam having a quadratic phase profile, so that the beacon beam has a spherical diverging wavefront.

5. The communications method defined in claim 1 further comprising generating a beacon beam having a spatially random phase pattern.

6. The method of communication as recited in claim 5, wherein the conjugate beacon beam fills the entire receiver aperture upon the return path.

7. The communications method defined in claim 1 wherein the deflection angle is proportional to the angle of incidence.

8. The method of communication as recited in claim 1 wherein the communications beam is comprised of single photons.

9. The method of communication as recited in claim 1 wherein a receivers aperture diameter can be arranged in the fixed optical path of the received communications beam after deflection by the processed grating pattern in the spatial light modulator.

10. A method of communication that uses a laser beam comprising:
    intercepting a receiving means with a conjugate beacon beam;
    forming a first hologram by interfering the conjugate beacon beam with a local oscillator beam;
    generating a secondary beacon beam responsive to the first hologram so that it intercepts a transmitting means;
    forming a secondary conjugate beacon beam responsive to the secondary beacon beam;
    intercepting the receiving means with the secondary conjugate beacon beam at an angle of incidence;
    forming a second hologram responsive to the angle of incidence;
    deflecting the laser beam through a deflection angle responsive to the second hologram, to a fixed course relative to the local oscillator beam; and
    detecting the deflected laser beam.

11. The communicating method as recited in claim 10 wherein the step of forming the second hologram includes interfering the secondary conjugate beacon beam with the local oscillator beam.

12. The method of communication as recited in claim 11 wherein the step of deflecting the laser beam includes:
    writing a diffraction grating pattern responsive to the second hologram on a spatial light modulator; and
    applying the laser beam to the spatial light modulator.

13. The method of communication as recited in claim 12 further comprising;
    generating a beacon beam by writing a spatially random phase profile on the spatial light modulator; and
    deriving the conjugate beacon beam from the beacon beam.

14. The method of communication as recited in claim 10 wherein the deflection angle is proportional to the angle of incidence.

15. The method of communication as recited in claim 10 wherein the fixed course of the laser beam is parallel to the local oscillator beam.

* * * * *